Patented Dec. 28, 1937

2,103,286

UNITED STATES PATENT OFFICE 2,103,286

METHOD OF PRODUCING COMPOUNDS OF CYCLIC β-KETOCARBOXYLIC ACIDS

Karl Ziegler, Heidelberg, Germany, assignor to Schering-Kahlbaum A. G., Berlin, Germany, a corporation of Germany No Drawing. Application June 4, 1934, Serial No. 728,855. In Germany June 13, 1933

8 Claims. (Cl. 260—124)

This invention relates to organic compounds and more particularly to derivatives of cyclic β-ketocarboxylic acids and to a method of producing such compounds; it is a continuation in part of my copending application, Serial No. 684,233, filed August 8, 1933.

According to the process described in said copending application bivalent nitriles of the general formula

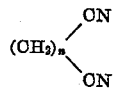

are condensed to cyclic cyanoketimides of the general formula

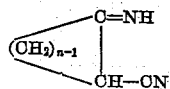

The latter are transformed by gentle saponification into cyclic α-cyanketones of the general formula

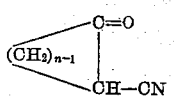

wherein $n$ is an integer greater than three, and by further saponification into the corresponding cyclic ketones. In order to obtain good yields of such cyclic cyanoketimides with more than six carbon atoms in the ring system it was necessary to carry out the reaction in a state of high dilution.

On further improving said process, it has been found, that with the same agents and while observing the same precautions insuring a high yield of the cyclic products, also other derivatives of dicarboxylic acids can be condensed to derivatives of cyclic ketocarboxylic acids which form cyclic ketones on hydrolysis. This hydrolysis reaction may be expressed by the following equation:

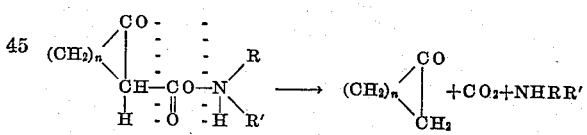

In general, those derivatives are suitable for the reaction in question which do not possess any reactive hydrogen atom attached to the carboxyl group, namely, those derivatives which on hydrolysis and/or saponification may be transformed into the carbonyl group of the acyl radical as, for instance, the esters of said acids, acid amides the nitrogen atom being alkylated twofold, iminoesters of the configuration

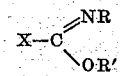

wherein X represents a hydrocarbon or substituted hydrocarbon group as for example the compound

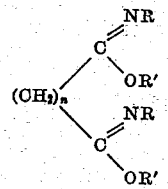

amidines the hydrogen atoms of their amino and iminogroup being completely substituted, and other compounds R and R' represent organic radicals.

Mixed derivatives of said acids may also be used as starting materials which possess the above mentioned groups in any combination with each other or with a cyano group.

As condensing agents are used compounds of the type

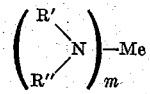

wherein R' and R'' may be alkyl, aralkyl, aryl or alicyclic radicals while Me may be an alkali metal, an alkaline earth metal or an earth metal, as, for instance, lithium, sodium, magnesium aluminum or the like, $m$ being the valency of this metal. Among the condensing agents used may be those containing polyvalent metals and having halogen attached to the metal in addition to the amido group, as set forth in Example 1 of my copending application above identified, as for example bromomagnesium diethylamide which is specifically described in said application, and which compounds may be indicated by the general formula

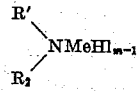

wherein Hl is halogen and $m$ is the valence of the metal Me. Other condensing agents not containing halogen also are expressed by said general formula in which Hl is a

All the above described agents are comprehended in the present application.

The following examples serve to illustrate the invention without, however, limiting the same to them.

*Example 1*

40 parts of finely divided sodium amide are added in a nitrogen atmosphere to 1000 parts of ethyl aniline. The mixture is heated to about 100–150° C. and is stirred until no more ammonia is developed. Thereupon a solution of 34 parts of hexadecane-1,16-dicarboxylic acid dimethyl ester in 500 parts of ethylaniline is run gradually and slowly into the above mentioned mixture thereby keeping the temperature at about 120–150° C. and stirring vigorously. After the reaction has been completed the mixture is treated by adding water thereto whereby the residual metal amide is decomposed and the ethyl aniline is steam-distilled. The resinous residue contains the ethylanilide of the cycloheptadecanone-(1)-carboxylic acid-(2) in mixture with other reaction products. On intensively boiling the residue for several hours with 70% sulfuric acid, extracting the product formed thereby with ether, and evaporating the ether, cycloheptadecanone is obtained by the hydrolysis of the primary product which yields besides the ketone $CO_2$ and ethyl aniline.

Instead of the ester, also the acid dichloride or the diethylanilide of the hexadecane-1,16-dicarboxylic acid may be used. In the course of the reaction the dichloride is transformed into the diethylanilide.

*Example 2*

Equal volumes of about normal ethereal solutions of lithium diethylamide and ζ-cyano heptylic acid diethylamide, both solutions being of equal strength are filled into two burettes, from where they are allowed to run gradually and very slowly, while stirring, into a glass flask, wherein 750 ccs. of absolute ether are kept at the boiling point. The reaction mixture is worked up in a similar manner as described in Example 1 yielding α-cyano suberone.

Instead of the cyano heptylic acid diethyl amide the cyano heptylic acid esters may be used. In the latter case, however, the solution of the lithium diethylamide has to be of twofold normality.

*Example 3*

A solution of sodium ethylaniline in ethylaniline is obtained by heating 10 grams of sodium amide and 150 ccs. of ethylaniline at 150° C. until no more ammonia is developed. This solution is heated to 160° C. while excluding any presence of air and stirring vigorously. A mixture of 13 grams of suberic acid methyl ester and 50 ccs. of ethylaniline is allowed to run uniformly and gradually into said solution in the course of 9 hours. Thereupon the reaction mixture is decomposed by water, the ethylaniline layer is separated and as far as possible evaporated to dryness in a vacuum. Small amounts of the amine are removed from the residue by means of dilute sulfuric acid. The remaining residue is isolated by means of ether and is distilled in a high vacuum. A viscous oily distillate passes over between 120–130° C. under a pressure of 0.2 mm. The yield amounts to 10 grams corresponding to 60% of the theoretical yield. The compound solidifies and has a melting point of 62–64° C. after recrystallization from petroleum ether. It represents the ethylanilide of the suberic acid of the structural formula:

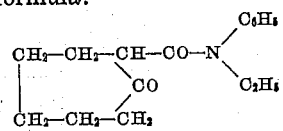

The same compound is obtained in an analogous manner from the diethylanilide of suberic acid of the melting point 88–90° C. The diethylanilide is made by reacting the corresponding dichloride with ethyl aniline.

*Example 4*

32.4 grams of adipic acid dimethylanilide are added to 300 ccs. of a 0.7 molar ethereal solution of sodium methylanilide. The mixture is gently shaken for 30 hours in an indifferent atmosphere. In the course of the reaction a difficultly soluble sodium compound precipitates. The reaction mixture is poured into an amount of dilute sulfuric acid necessary for neutralizing the fixed alkali, and the reaction product is isolated by distilling off the methylaniline in a vacuum. The remaining residue of 19 grams, instead of the theoretical amount of 21.7 grams, is distilled in a high vacuum. An oil distills at 125–130° C. at a pressure of 0.2 mm. which solidifies on cooling. 15.5 grams of colorless crystals representing the methylanilide of the cyclopentanone carboxylic acid of the structural formula

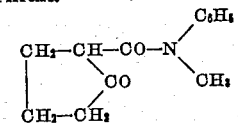

corresponding to a yield of 71.4% of the theoretical amount are obtained which after recrystallization from petroleum ether have a melting point of 64–65° C. The compound yields a dark blue coloration with iron chloride in alcohol.

The starting material, the adipic acid dimethylanilide, is obtained from the acid chloride in the usual manner. Its melting point is 85–86° C. on recrystallization from acetone.

*Example 5*

3.9 grams of potassium are heated in a nitrogen atmosphere at 140° C. with 200 ccs. of methylaniline. Thereupon a slow current of ammonia is introduced into the mixture while stirring vigorously. The potassium is completely dissolved within one hour. The outside temperature is then increased to about 160° C., and 17.5 grams of suberic acid dimethylanilide dissolved in 130 ccs. of methylaniline are continuously run into said solution in the course of 7 to 8 hours. After cooling, 50 ccs. of 2 N-hydrochloric acid are added and the oily layer which does not separate well, is extracted by means of ether. The ether is driven off and the methylaniline is distilled off in a vacuum. About 12 grams of a residue are obtained which distill at 135–150° C. under a pressure of 0.1 to 0.3 mm. The viscous oily distillate solidifies on standing for a longer period of time. 7 grams of a compound having the structural formula $$CH_2\begin{matrix}CH_2-CH_2-CH-CO-N\begin{matrix}CH_3\\C_6H_5\end{matrix}\\CH_2-CH_2-CO\end{matrix}$$

are obtained, having a melting point of 41–45° C. after triturating the same with petroleum ether and sucking it dry.

The starting material, the suberic acid dimethylanilide is obtained by reacting the acid chloride with methylaniline. After recrystallization from acetone it has a melting point of 114° C.

Of course, various changes and modifications may be made in the process described by those skilled in the art in accordance with the principles set forth herein and in the claims annexed hereto.

What I claim is:

1. A method of producing compounds of cyclic β-keto carboxylic acids comprising acting on compounds of the general formula $$(CH_2)_n\begin{matrix}A\\B\end{matrix}$$

wherein $n$ is an integer greater than three and wherein A represents a member of the class consisting of cyano group and a group of the general formula $$-C\begin{matrix}=Y\\Z\end{matrix}$$

and B represents the same or different groups of the general formula $$-C\begin{matrix}=Y\\Z\end{matrix}$$

wherein Y is a radical taken from the class consisting of O and NR and Z is a radical taken from the class consisting of OR and NR$_2$, R denoting a hydrocarbon radical, said groups being capable of transformation by saponification into the carbonyl group of the acyl radical with a condensing agent of the type $$\begin{matrix}R'\\R''\end{matrix}N\ MeHl_{m-1}$$

wherein R' and R'' are radicals taken from the class consisting of alkyl, aralkyl, aryl and alicyclic, Hl is halogen or $$\begin{matrix}R'\\R''\\R'''\end{matrix}N$$

while Me is a metal of the group constituted by the alkali, alkaline earth and earth metals and $m$ denotes the valency of this metal.

2. A method of producing compounds of cyclic β-keto carboxylic acids comprising acting on compounds of the general formula $$(CH_2)_n\begin{matrix}A\\B\end{matrix}$$

wherein $n$ is an integer greater than three and wherein A represents a member of the class consisting of cyano group and a group of the general formula $$-C\begin{matrix}=Y\\Z\end{matrix}$$

and B represents the same or different groups of the general formula $$-C\begin{matrix}=Y\\Z\end{matrix}$$

wherein Y is a radical taken from the class consisting of O or NR and Z is a radical taken from the class consisting of OR and NR$_2$, R denoting a hydrocarbon radical, said groups being capable of transformation by saponification into the carbonyl group of the acyl radical with a condensing agent of the type $$\begin{matrix}R'\\R''\end{matrix}N\ MeHl_{m-1}$$

wherein R' and R'' are radicals taken from the class consisting of alkyl, aralkyl, aryl and alicyclic, Hl is halogen or $$\begin{matrix}R'\\R''\\R'''\end{matrix}N$$

while Me is a metal of the group constituted by the alkali, alkaline earth and earth metals and $m$ denotes the valency of this metal, and subjecting the compounds thus formed to hydrolysis.

3. The method claimed in claim 1, in which the condensation is carried out in a state of high dilution.

4. The method claimed in claim 2, in which the condensation is carried out in a state of high dilution.

5. A method of producing compounds of cyclic β-keto carboxylic acids comprising acting on compounds of the general formula $$(CH_2)_n\begin{matrix}A\\B\end{matrix}$$

wherein $n$ is an integer greater than three and wherein A represents a cyano group or a group of the general formula $$-C\begin{matrix}=Y\\Z\end{matrix}$$

and B represents the same or different groups of the general formula $$-C\begin{matrix}=Y\\Z\end{matrix}$$

wherein Y is a radical taken from the class consisting of O and NR and Z is a radical taken from the class consisting of OR and NR$_2$, R denoting a hydrocarbon radical, said groups being capable of transformation by saponification into the carbonyl group of the acyl radical, with an alkali metal amide.

6. The cyclic compounds of the general formula $$(CH_2)_n\begin{matrix}CH-CON\begin{matrix}R'\\R''\end{matrix}\\CO\end{matrix}$$

wherein R' and R" are radicals taken from the class consisting of alkyl, aralkyl, aryl and alicyclic radicals while $n$ denotes an integer greater than three.

7. A method of producing compounds of cyclic β-keto carboxylic acids comprising acting on a derivative of a saturated organic dicarboxylic acid of more than four carbon atoms selected from the class consisting of esters of said acids, amides of said acids the nitrogen atom of which is alkylated two-fold, iminoesters of said acids, amidines of said acid, the hydrogen atoms of their amino and imino groups being completely substituted, derivatives of said acids containing at least two of the following groups: esters, amides the nitrogen atom of which is alkylated two-fold, imino esters, amidines the hydrogen atoms of their amino and imino groups being completely substituted, derivatives of said acids containing a cyano group and one of the following groups: esters, amides the nitrogen atom of which is alkylated two-fold, imino esters, amidines the hydrogen atoms of their amino and imino groups being completely substituted, with a condensing agent comprising essentially a metal amide compound in which the hydrogen atoms attached to nitrogen have been substituted by hydrocarbon radicals.

8. The method claimed in claim 7, in which the condensation is carried out in a state of high dilution.

KARL ZIEGLER.